United States Patent [19]

Ansbjer

[11] Patent Number: 4,549,840

[45] Date of Patent: Oct. 29, 1985

[54] SELF-LOADING CARRIAGE FOR ROUND BALES

[76] Inventor: Jan Ansbjer, Skogsvillan, S-465 00 Nossebro, Sweden

[21] Appl. No.: 596,145

[22] Filed: Apr. 2, 1984

[51] Int. Cl.⁴ ............................................. A01D 87/12
[52] U.S. Cl. .................................. 414/24.5; 198/744; 414/501; 414/525 R; 414/552; 414/719
[58] Field of Search ..................... 414/24.5, 24.6, 501, 414/509, 512, 516, 517, 525 R, 546, 551, 552, 719; 198/741, 744, 746, 747, 749

[56] References Cited

U.S. PATENT DOCUMENTS

| | | | |
|---|---|---|---|
| 938,152 | 10/1909 | LaLonde | 414/719 |
| 2,804,219 | 8/1957 | Hewson et al. | 414/552 |
| 3,924,765 | 12/1975 | Hostetler | 414/24.5 |
| 3,938,669 | 2/1976 | Vinton | 414/719 X |
| 4,076,138 | 2/1978 | Honomichl | 414/24.5 |
| 4,101,081 | 7/1978 | Ritter et al. | 414/501 X |
| 4,117,940 | 10/1978 | Adam | 414/24.5 |
| 4,261,676 | 4/1981 | Balling | 414/24.5 |

FOREIGN PATENT DOCUMENTS

| | | | |
|---|---|---|---|
| 166764 | 9/1950 | Austria | 198/746 |
| 1073218 | 3/1980 | Canada | 414/24.5 |
| 2373224 | 12/1976 | France | |
| 2445100 | 12/1979 | France | |
| 1308299 | 2/1973 | United Kingdom | 414/517 |

*Primary Examiner*—Leslie J. Paperner
*Attorney, Agent, or Firm*—Witherspoon & Hargest

[57] ABSTRACT

A self-loading cylindrical bale carriage having at least one frame member including a center frame member extending along the longitudinal center line thereof. The frame member provides a supporting sliding surface for bales loaded on the carriage by means of a rocker bale loading arm device located at the forward end and at one side of the carriage. A transverse element carried by at least one longitudinally reciprocating member feeds the bales rearward on the carriage in cooperation with a plurality of self-rising wedges pivotally mounted in the reciprocating member or members and adapted to engage the bales with a delay with respect to the engagement of the bales by the transverse element.

10 Claims, 5 Drawing Figures

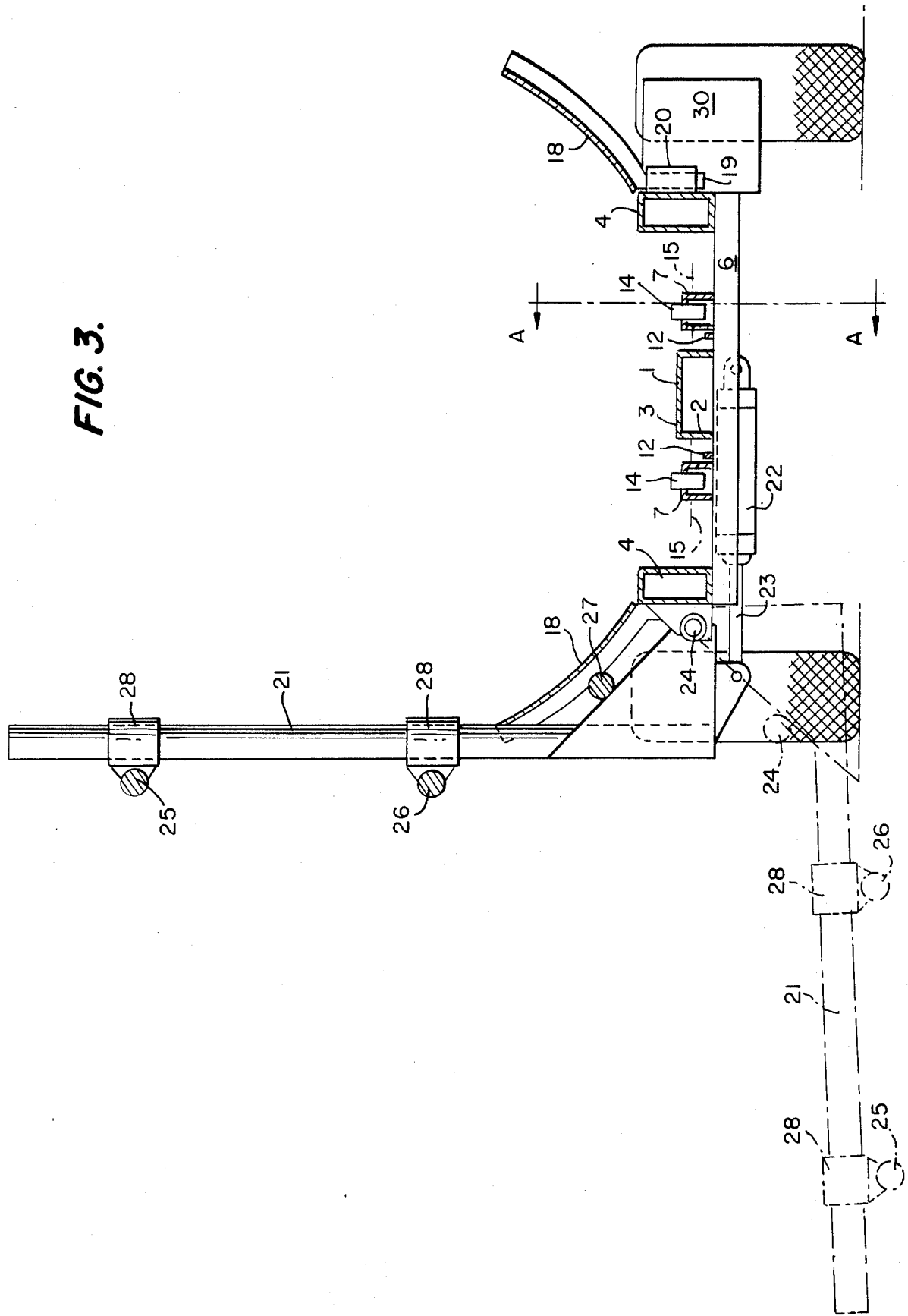

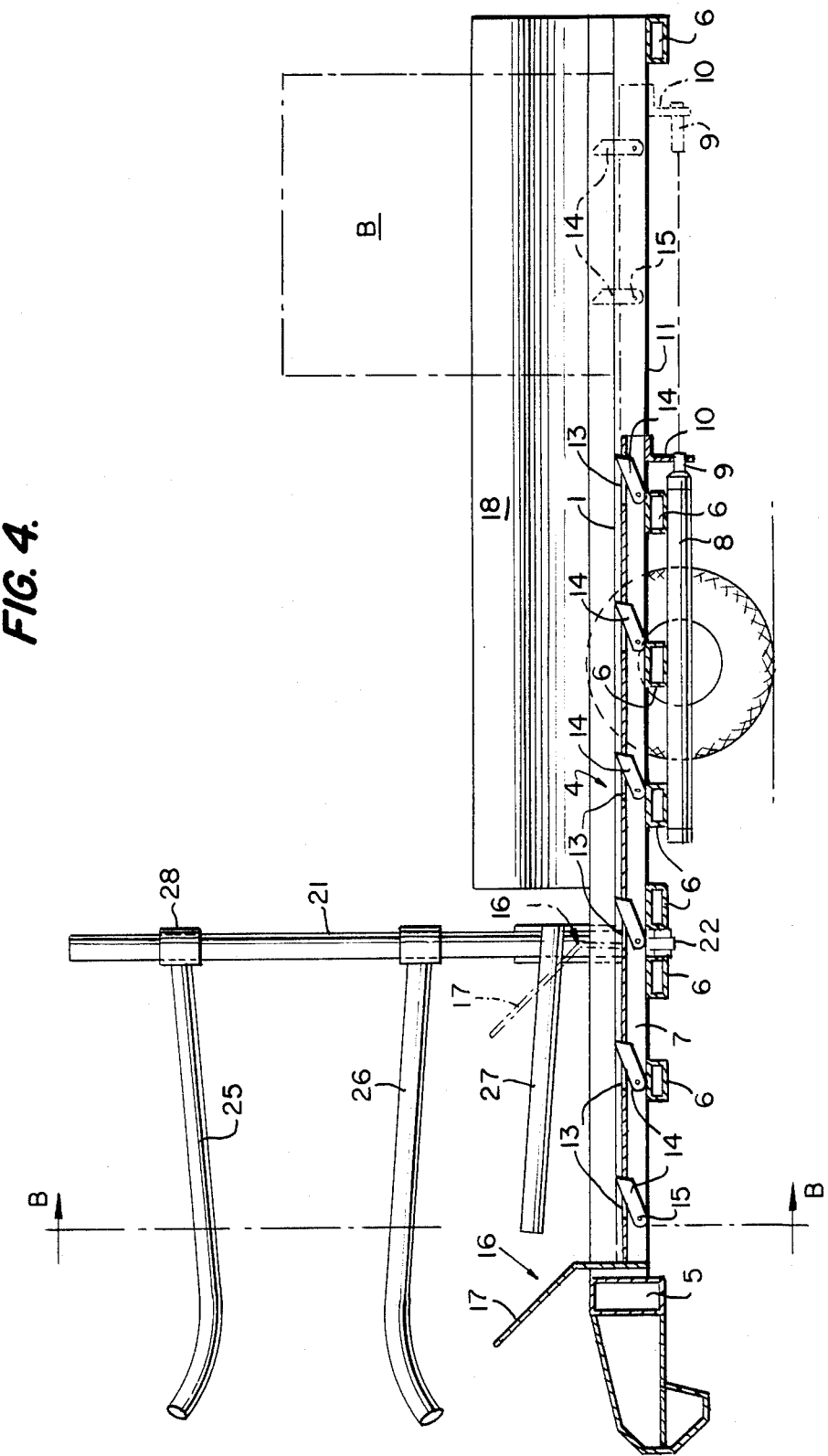

SELF-LOADING CARRIAGE FOR ROUND BALES

BACKGROUND OF THE INVENTION

1. Field of the Invention

This invention relates to a self loading carriage for cylindrical bales. The carriage is adapted to be coupled to a tractor and to be operated by means of a power take-off therefrom.

2. Description of the Prior Art

It has lately become common practice to pack hay, straw, etc. in the form of cylindrical bales since these, as is known to the experts, offer many advantages.

A critical stage in the handling of cylindrical bales is the collection thereof from the field for conveying them to a place of storage or use. Special implements have been designed for such collection and conveyance. All hitherto known implements of this kind are very heavy, complicated, unwieldly and costly.

Accordingly, it is an object of this invention to provide a self-loading carriage for cylindrical bales, the carriage being of simple design and of low cost.

A further object of this invention is that such self-loading carriage permit maneuverability simplified to such an extent that the carriage be completely controllable by one person sitting on the tractor. These objects are attained through the round bale carriage according to the attached claims.

SUMMARY OF THE INVENTION

This invention achieves these and other objects by providing a self-loading carriage for cylindrical bales. The carriage may be coupled to a tractor and operated by the power take-off thereof. The structure includes a center frame member extending lengthwise of the carriage for supporting bales loaded thereon from ground level by means of a hoisting device located at the forward end and to one side of the carriage. At least one reciprocating member including a pusher and having a plurality of wedges pivotally mounted thereto is mounted adjacent the center frame member. Reciprocation of the reciprocating member causes the pusher and wedges to convey the bales toward the rear of the carriage by sliding the bales upon the center frame member.

BRIEF DESCRIPTION OF THE DRAWINGS

A preferred embodiment of the invention is described in detail below with reference to the attached drawings, wherein FIG. 1a schematically shows the self-loading carriage of the invention drawn by a tractor and having loaded thereon all the bales it can accomodate except one, the hoisting mechanism being shown in a position in which it is about to pick up a last bale to complete loading of the carriage;

FIG. 3 is a transverse sectional view, on a still larger scale, taken along lines B—B of FIG. 4, with the hoisting mechanism shown in its raised position in solid lines and in its lowered position in broken lines; and, FIG. 4 is a longitudinal sectional view, on a scale between those of FIGS. 1 and 2, taken along lines A—A of FIG. 3.

DESCRIPTION OF THE PREFERRED EMBODIMENT

Figure 1A:
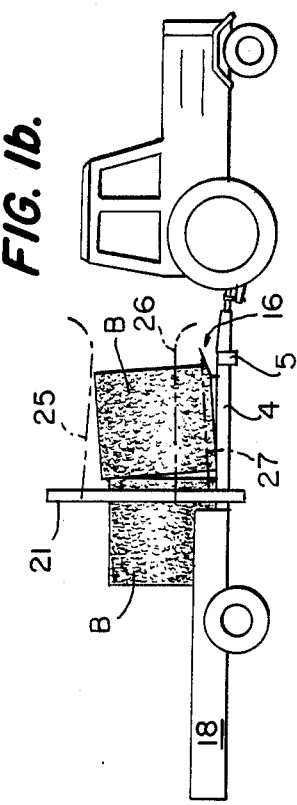
FIG. 1b schematically shows the carriage of the invention with the hoisting mechanism shown in the position in which it is placing a second bale on the carriage.
Figure 1B:
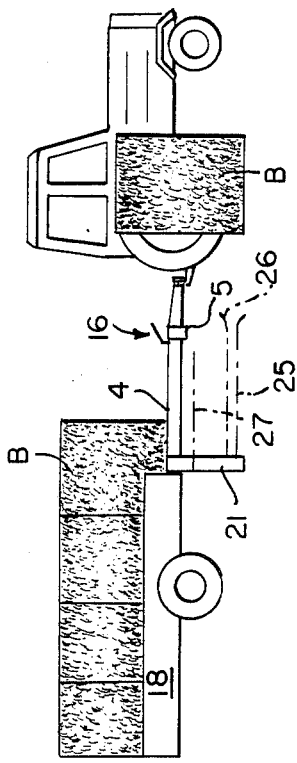

The embodiment of this invention which is illustrated in the drawings is one which is particularly suited for achieving the objects of this invention. The carriage is depicted as including two wheels, and a hitch or coupling means for coupling the carriage to a tractor as shown in FIGS. 1a and 1b. When the carriage is coupled to the tractor it is also connected to a power take-off, such as a hydraulic take-off. Although such a connection is not shown, any means known in the art may be provided to connect the carriage mechanism to such power take-off to provide power for operating the carriage mechanism as described herein.

The carriage includes a frame, the main member of which is a center frame member 1 which extends generally along the longitudinal center line of the carriage, and flanges 2 which extend downwardly. Web 3 constitutes an essential portion of the bottom of the carriage. The frame is completed by lateral section elements 4, a forward end transverse element 5 joining lateral section members 4, and transverse members 6 spaced along the length of the carriage and consisting of section elements. Between lateral section members 4 and center frame member 1 there are provided two longitudinally movable reciprocating members 7, one on each side of center frame member 1. Members 7 may be in the form of inverted (web up) channel elements or tubes or preferably square cross-section which are supported by transverse members 6 so as to be reciprocatingly drivable thereupon by means of a cylinder-piston assembly 8, 9 driven by the hydraulic system of the tractor through a hydrautake-off connection (not shown). Reciprocating members 7 have their top faces somewhat below the top face of web 3 of the center frame member 1 and are shorter than the carriage by an amount to allow members 7 to reciprocate longitudinally of the carriage as explained in more detail below.

Cylinder-piston assembly 8, 9 preferably is placed to act on the rear ends of reciprocating members 7. In the preferred embodiment of the invention illustrated in the drawings, cylinder-piston assembly 8, 9 is mounted below the carriage with its piston 9 attached to a transverse connecting member 10 joining the rear ends of reciprocating members 7. Obviously, extension of piston 9 will result in connecting member 10 and consequently reciprocating members 7 being moved backwards, and vice versa. As will become evident from a later section of this specification, the movement of reciprocating members 7 backwards represents their work stroke. During the work stroke, members 7 are pulled rather than pushed whereby the guiding and reliability of this stroke is improved. The distance travelled by members 7 preferably is about one meter. The distance between the two rearmost transverse members 6 is selected to be large enough to permit connecting member 10 to carry out its reciprocatory movement. To support the rear ends of reciprocating members 7 during their reciprocatory motion between the two rearmost transverse members 6 the space between the latter is bridged by two flat iron bars 11, one for each reciprocating member 7. Bars 11 extend along the lines of travel of the rearmost transverse members 6 with their top faces in the plane defined by the top faces of transverse members 6. Of course, connecting member 10 is short enough to allow it to move between iron bars 11. To further guide reciprocating members 7 knobs 12 may be attached to transverse members 6, as for example, by being welded thereto, just inside each reciprocating member 7. Of course, they could just as well be placed immediately outside members 7.

Reciprocating members 7 have in their top faces elongated rectangular apertures 13 oriented such that their long dimension extends longitudinally of reciprocating members 7. Apertures 13 are distributed along the length of member 7. Inside each one of these apertures 13 is mounted a wedge 14 comprising an elongated rectangular metal rod which is pivotally mounted at 15 inside aperture 13 and adjacent its one end, the other end of wedge 14 being somewhat oblique of bevelled. Pivot 15 is located with respect to aperture 13, and wedge 14 is of such length, that wedge 14 with its bevelled end face can rest on the rear edge of aperture 13. In this manner one of the end corners of wedge 14 protrudes somewhat above the top face of member 7 as is clearly evident from FIG. 4.

As mentioned, the top surface of web 3 of center frame member 1 is somewhat above the level of the plane defined by the top faces of the two reciprocating members 7. By providing such structure, web 3 serves to support round bales B to be conveyed by the carriage. Furthermore, reciprocating members 7 are joined at their forward ends by a pusher or transverse element 16, preferably of plate steel and having a portion 17 somewhat above center frame member 1 and inclined upwardly and forwardly at an angle of preferably about 45°. Element 16 hence reciprocates with reciprocating members 7. After a round bale B, by means of a mechanism to be described below, has been hoisted up on the carriage and positioned with one of its flat ends adjacent element 16 (FIG. 1b), the operator actuates cylinder-piston assembly 8, 9 to cause reciprocating members 7 and consequently element 16 to make first one and then as a rule additionally about one half stroke, to move bale B rearward and provide sufficient room for the next bale to be loaded. Bale B rests on the top face of center frame member 1 with its sides projecting over reciprocating members 7. However, members 7 having their top faces in a plane somewhat below the top face of center frame member 1 will not contribute to the pushing of bale B rearward. If this were not so, reciprocating members 7 would tend to move loaded bales B counter to the bale feed direction; i.e. forward on the carriage when making their forward, or return, stroke. Hence, the first bale B loaded on the carriage initially will be pushed rearward by element 16 only. FIG. 4 shows element 16 and piston 9 in their rear end positions with broken lines. By making piston 9 carry out one and about one half stroke as mentioned, the operator thus will first push bale B about one bale length backwards on the carriage since element 16 will push the bale backwards one stroke length. When the operator makes the additional half stroke or so he will not be helped by element 16 in moving the bale further, since element 16 does not move rearward any further than the position shown in broken lines. However, wedges 14, with their rear end top corners in the inactive positions shown with solid lines in FIG. 4, protrude somewhat above the top faces of reciprocating members 7. The amount by which they protrude and the height of the top faces of reciprocating members 7 are selected to be such with respect to the height of the top face of center frame member 1 that wedges 14 have their rear end top corners in contact with the portions of a bale B overlaying reciprocating members 7. This can be inferred without difficulty from FIGS. 3 and 4 although in order not to clutter these figures, no bale is shown therein overlying wedges 14 in their inactive positions. This being the case, as the reciprocating members 7 move under bale B, taking with them wedges 14, the wedges will engage the material constituting the bottom surface of the bale, rotate about their pivots 15, and, as shown with broken lines in FIG. 4, pivot out of their apertures 13 until stopped in a more or less vertical position by the forward edges of apertures 13. In such vertical position, wedges 14 project into the material of the bale and slightly raise the bale to ease the pressure of the bale against the top face of center frame member 1 and reduce the friction thereagainst. It will be apparent that wedges 14 push the bale rearward as wedges 14 are moved by members 7. A bale B completely pushed to the rear end of the carriage and having two wedges 14 projecting into it is shown with broken lines in FIG. 4.

The operator now has moved bale B backwards on the carriage a sufficient amount to make room for the next bale B to be loaded. Of course, the length of the stroke of piston 9 could be arranged to be large enough to permit bales B to be pushed by pusher 16 far enough backwards on the carriage to make room for a subsequent bale. However, this would considerably increase the cost of the carriage since this would call for both a larger cylinder-piston assembly and a longer carriage. It is not possible to dispense with wedges 14 to transport bales B along the carriage using only a longer piston stroke and element 16 for pushing the first bale by its first increment along the carriage, and bales loaded subsequently for pushing the first loaded bales along the carriage, since such an arrangement would not allow the carriage to be unloaded.

In moving first bale B rearward a first increment along the carriage, the operator need not be especially careful, within reason, in choosing the length of such increment to make room for the next bale to be loaded. If a bale is not pushed rearward on the carriage a full bale length, then the operator may place the next bale with its forward end resting more or less far up inclined portion 17 of element 16; that is, far up enough for the bale to be placed forwardly of the bale first positioned on the carriage. If, on the other hand, the first bale is moved rearward on the carriage somewhat further than a bale length, then, of course, there will be ample room for the next bale. This would seem to be quite disadvantageous, since loading the carriage with spaces between bales B would mean a severely reduced loading capacity of the carriage. However, when the second bale is being pushed rearward on the carriage by the operator actuating piston 9 as described above, the first bale is initially not moved at all since it is resting on the top face of web 3 of immobile center frame member 1 and the top faces of reciprocating member 7 are not in contact with the bottom surface of the bale with enough pressure to exert any motive force on the bale. In addition, wedges 16 which previously had been raised to project into the bale to act as drivers therefore as described are withdrawn from the bale and rotated about their pivots 15 to return to their inactive position; i.e., resting with their bevelled end faces against the backward edges of apertures 13, during the return stroke of reciprocating members 7 and element 16 in preparation for receiving the next bale. However, after a short initial rearward movement of reciprocating members 7, with the bale resting immobile on center frame member 1, wedges 14 again will pivot to engage the material constituting the bottom surface of the bales and will be raised to thereupon act as drivers for the bale. But it will take some time for wedges 14 to engage the bale and pivot to their more or less vertical, active positions; i.e. it will take a certain portion of the length of the stroke for wedges 14 to assume such vertical positions. On the other hand, the second bale will be set in motion immediately as the stroke is initiated by element 16. Hence, the second bale will overtake the bale loaded before it to close the initially existing space between them. Thereby the bales will be loaded in the carriage in mutual contact, and much space will be conserved.

Both the fact that the operator need not position a bale being loaded with any precision on the carriage, and the fact that the arrangement feeding the bales rearward in the carriage will automatically eliminate any spaces between the bales as loaded, are very advantageous. The first circumstance saves much time in the field, and the second circumstance conserves considerable loading space in the carriage which means that the carriage can be made substantially shorter than would otherwise have been required. This is an advantage per se but also means that the carriage can be made from section elements of standard lengths and still have a length sufficient for a suitable number of bales. This, of course, means considerable cost savings.

Lateral frame members 4 are dimensioned and mounted such that with their top faces they project somewhat above the level of the top face of center frame member 1. They thereby keep bales B in position and guide the bales as they are moved rearward on the carriage. To additionally make sure that the bales are retained on the carriage there are preferably provided detachable lateral members 18 which extend along the carriage and somewhat upwardly therefrom. As can be seen from FIG. 3, one edge of lateral members 18 is provided with a suitable number of pins 19 to be received by a corresponding number of tubular, preferably bottomless holders 20 fixed to lateral members 4. As can be immediately seen, this arrangement provides for easy attachment and removal of members 18 as well as secure holding thereof to members 4 when attached. Members 18 may also function as mud flaps and therefor preferably consist of metal plates. As shown they are preferably arched transversely but they may also be constituted by flat plates. Lateral members 18 are especially of importance during transport of a loaded carriage.

Figure 2:
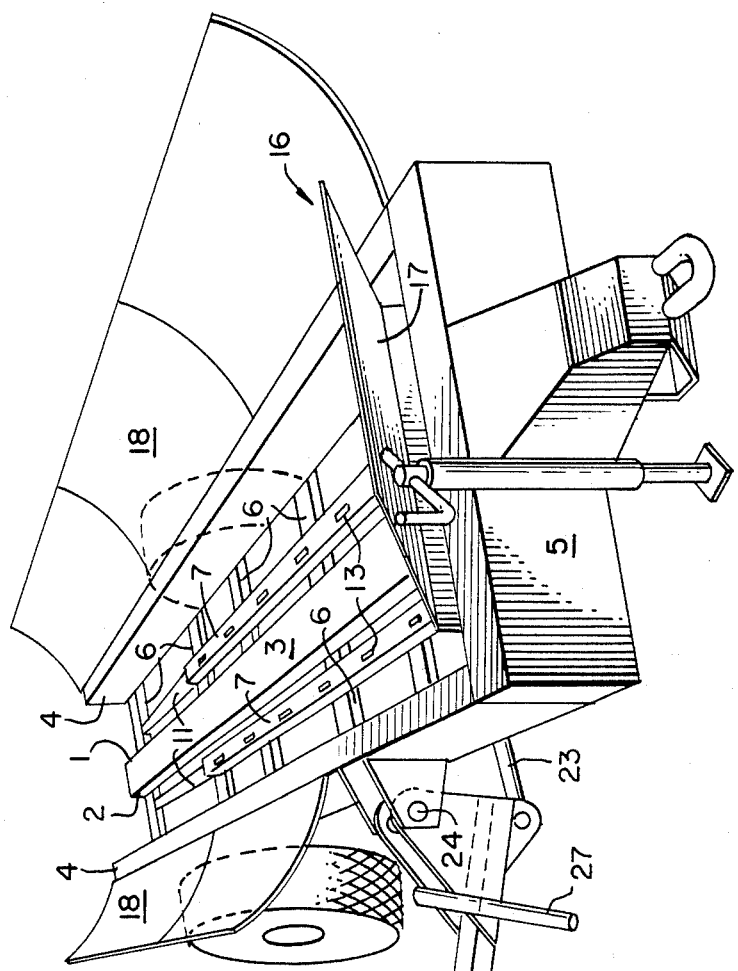
FIG. 2 is a perspective view showing on a larger scale the carriage of the preferred embodiment of the invention.

As shown especially in FIGS. 2 and 4 one of members 18 does not extend to the forward end of the carriage but is shortened to give room for a bale loading mechanism and to permit loading of bales B by means of the bale loading mechanism.

The bale loading mechanism consists of a rocker arm 21 actuable by a hydraulically driven cylinder-piston assembly 22, 23 and pivoted adjacent the forward end of the carriage. Rocker arm 21 is rockable from a position wherein it is adjacent the ground as shown in FIG. 1a and in broken lines in FIG. 3, and to a position wherein it is more or less vertical as shown in FIG. 1b and in solid lines in FIG. 3. Of course, and as is evident especially in FIGS. 2 and 3, pivot axis 24 is parallel with the longitudinal axis of the carriage and rocker arm 21 is substantially normal thereto.

Rocker arm 21 carries three bale catching section elements, depicted as spears 25, 26, 27 which project forwardly from the rocker arm and by means of which bales lying on the ground are picked up to be hoisted up on the carriage as shown in FIGS. 1a and 1b. Of these, one spear 25 is located adjacent the outer end of rocker arm 21, a second spear 26, near the middle of the arm and a third spear 27, near the inner end of the arm. The two outermost spears 25 and 26 are curved outwardly and inwardly, respectively, at their outer ends in a plane which is substantially horizontal when rocker arm 21 is in the lowered position. In this manner, the spears are prevented from digging into the ground when the carriage is moved forward. Spears 25 and 26 are also preferably somewhat inclined toward each other which has the effect of making the axis of a bale parallel with the longitudinal axis of the carriage when being picked up, should the bale be lying on the ground with its axis making an angle to the longitudinal axis of the carriage (and the driving direction). Also, the two outermost spears 25, 26 are preferably adjustable along rocker arm 21 to permit adaptation to different bale sizes by being attached to rocker arm 21 by brackets 28 slideable along the arm and lockable thereto at any desired position by means of set screws 29. Third spear 27 is somewhat shorter than the other two spears 25, 26 and, in the position of the rocker arm, is angled somewhat upwardly and inwardly to facilitate roll off of a bale from the bale loading mechanism when rocker arm 21 approaches its vertical or raised position during the hoisting of the bale. In a similar manner, the bale being raised is inclined such that the placement thereof forwardly of an already loaded bale is facilitated when the loaded bale is located such that it does not leave space between pusher 16 and its forward end fully corresponding to a bale length. In this situation forwardly-upwardly inclined portion 17 of element 16 facilitates placing the bale being loaded on center frame member 1 since it can now function as a sliding surface for the forward edge of the bale.

A possible variation of the embodiment described above is constituted by a replacement of the two reciprocating members 7 by a single such member, in such case preferably recessed in center frame member 1 or located between two frame members extending on either side of the longitudinal center line of the carriage and replacing center frame member 1.

The cylinder-piston assembly 22, 23 by means of which rocker arm 21 is actuated preferably is of the single-acting type so as not to counteract the minor movements upwardly and downwardly that the rocker arm has to carry out as the carriage is moved over more or less uneven ground.

Preferably a detachable counterweight 30 (FIG. 3) is placed opposite rocker arm 21, preferably more or less inside the carriage wheel on the counterweight side.

It will be apparent to those skilled in the art that the carriage may also be unloaded at the rear thereof by the bale feeding movements described above merely by reciprocating the members 7 until the last bale has been unloaded.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A self loading carriage for cylindrical bales (B) adapted to be coupled to a tractor and to be operated via the power take-off thereof, characterized in that the carriage frame, constructed from section elements, comprises at least one stationary center support frame member (1) extending along the longitudinal center line of the carriage, said at least one center frame member offering a supporting surface for cylindrical bales (B) hoisted from the ground and loaded on the carriage, with their axes substantially parallel with the longitudinal axis of the carriage, by a hoisting device located at the forward end of the carriage with respect to the intended driving-direction thereof and at one side of the carriage and operated from the power take-off thereof, said at least one center member providing a supporting surface for round bales upon which the latter are slideable, and that adjacent said suporting surface at least one member (7), having a surface extending in a plane below the plane of said supporting surface reciprocatable in the longitudinal direction of the carriage is provided, said at least one member (7) comprising conveying means including a pusher (16) associated with at least one forward end of said at least one member (7) and drivers (14) extending from said surface of said at least one member (7), said drivers (14) protruding only slightly above said surface of said at least one member (7) and in an inactive position during a first stroking motion of said at least one member (7) so that said pusher (16) can convey a bale a first distance along said stationary center support frame member (1), and said drivers (14) being rotatable by said bale to a substantially vertical position above said surface of said at least one member (7) and in an active position during a second stroking motion of said at least one member (7) so that said drivers (14) can convey said bale a second distance along said stationary center support frame member (1).

2. The round bales carriage of claim 1, characterized in that said supporting surface for bales loaded on the carriage is provided by the web (3) of a channel element (1) extending along the longitudinal center line of the carriage, the flanges (2) of the channel element extending downwardly.

3. The round bale carriage of claim 2, characterized by two reciprocating members (7) provided on each its side of the center frame member(1).

4. The round bale carriage of claim 1, characterized in that each reciprocating member (7) has its top surface somewhat below the level of said bale supporting surface, and that the bale drivers (14) consist of self-rising wedge which adjacent one end thereof are pivoted at pivot points located at the bottom of the reciprocating members and which with the free ends thereof project to such extent from elongated apertures (13) in the reciprocating members that said free ends are in contact with bales resting on said supporting surface, said apertures having a rearward edge against which the wedges proximate the rear ends thereof rest in an initial position, and a forward edge providing a stop for the wedges in a more or less vertical position thereof after they have been risen from the initial position during the rearward stroke of the reciprocating section element and as a consequence of the engagement of the wedges with bales resting on said supporting surface.

5. The round bale carriage of claim 1, characterized in that the pusher (16) consists of a transverse plate having a top portion (17) inclined upwardly-forwardly, preferably at an angle of about 45° to the horizontal plane.

6. The round bale carriage of claim 1, characterized by a single reciprocating member which is provided between two center frame members (1) providing said supporting surface for the bales.

7. The round bale carriage of claim 1, characterized in that the carriage frame comprises two longitudinal lateral members (4) extending the length of each carriage side with the top faces thereof at such level as to provide support for and guide bales conveyed along the carriage.

8. The round bale carriage of claim 1, characterized by upwardly-outwardly angled, detachable lateral members extending along the sides of the carriage, one of said lateral members being shortened at the forward end thereof to make room for the hoisting device and to permit loading of bales.

9. The round bale carriage of claim 1, characterized in that the hoisting device consists of a rocker arm (21) mounted proximate the forward end of the carriage and at one side thereof and operated by means of a single-acting cylinder-piston assembly (22,23), said rocker arm being rockable from a position adjacent the ground and to a substantially vertical position and projecting substantially at right angles from the side of the carriage and attached to the latter by a pivot shaft (24) parallel with the longitudinal direction of the carriage, said rocker arm carrying at least three long and narrow bale-catching members (25, 26, 27) projecting forwardly, viz. an inner bale-catching member (27) which in the horizontal position of the rocker arm is inclined somewhat inwardly towards the carriage and upwardly, and two outer bale-catching members (25, 26), somewhat inclined toward each other and movable along the rocker arm and lockable in optional positions therealong, the outer ends of the outer bale-catching members being curved in a plane which in the horizontal position of the rocker arm is substantially parallel with the horizontal plane.

10. The round bale carriage of claim 1, characterized in that the hoisting device is counter-balanced by means of a detachable counterweight (30) located at least partly inside the carriage wheel on the counter-weight side.

* * * * *